United States Patent Office 2,698,325
Patented Dec. 28, 1954

2,698,325

QUATERNARY AMMONIUM SALTS OF SUBSTITUTED PROPANOLAMINES

Donald Wallace Adamson, London, England, assignor to Burroughs Wellcome & Co. (U. S. A.) Inc., Tuckahoe, N. Y., a corporation of New York No Drawing. Application April 23, 1948,
Serial No. 22,946

Claims priority, application Great Britain May 28, 1947

7 Claims. (Cl. 260—247.7)

This invention relates to new therapeutic agents comprising a group of substituted gamma-hydroxypropylamines and has for its object the preparation of certain novel and useful quaternary ammonium slats of gamma, gamma-disubstituted-gamma-hydroxypropylamines. The new derivatives are therapeutically active as broncho dilators.

According to my invention I prepare N-trisubstituted-gamma, gamma - disubstituted-gamma-hydroxypropylammonium salts of the general formula

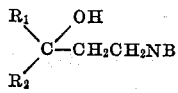

wherein $R_1$ and $R_2$ are selected from the class consisting of cyclohexyl and phenyl and NB is a member of the group consisting of lower dialkylamino, morpholino, piperidino and pyrrolidino.

In accordance with my invention these quaternary salts are made by treating an alkyl or aralkyl halide or other reactive acid salt with a tertiary amine to form corresponding quaternary derivatives.

The quaternisation, in accordance with my invention may be effected in a solvent such as anhydrous acetone, ethyl alcohol, dioxan at room temperature or at the boiling point of the solvent or at intermediate temperatures. Preferably an excess of the quaternising agent is employed. The solvent and the quantity used is preferably so selected that the quaternary salt crystallises from the reaction mixture on cooling. In cases when this cannot conveniently be done, a liquid in which the quaternary salt is insoluble (such as ether) is added gradually to the reaction product until crystallisation commences.

The N-disubstituted-γγ-disubstituted-γ-hydroxypropyl-amines may be prepared by bringing about a Grignard reaction between the appropriate β-tertiaryaminopropionic acid alkyl ester and an appropriate organo-magnesium halide and subsequently hydrolysing the organomagnesium compound so produced, or alternatively they may be made by bringing about a Grignard reaction between the appropriate β-tertiaryaminoethyl aryl ketone and an appropriate organomagnesium halide, and subsequently hydrolysing the organomagnesium compound so produced.

The new quaternary salts to which this invention relates are crystalline compounds, soluble in water. They are useful as therapeutic agents having antispasmodic and broncho-dilating action.

The following examples illustrate the invention:

Example 1

A solution of the ethyl ester of β-piperidino-propionic acid (37 grams) in dry ether is added gradually to an ether solution of the Grignard reagent made from bromobenzene (110 cubic centimetres) and magnesium (17 grams), stirred and cooled in a bath kept at 0° C. After stirring in the cold for 1 hour, the reaction mixture is heated under reflux for 2 hours and is then cooled to 0° C. and stirred into crushed ice. Concentrated hydrochloric acid is then gradually added to the stirred mixture, cooled to 0° C., until acid to Congo red. After standing for 1 hour at 0° C. the salt which separates is filtered off and washed with ether. The salt is suspended in chloroform and the suspension shaken with excess of concentrated ammonia solution and the chloroform layer separated, washed with water and dried. The chloroform is evaporated, leaving 3-N-piperidino-1:1-diphenylpropan-1-ol as a solid residue, which after recrystallisation from benzene or light petroleum, forms crystals which melt at 120–121° C.

3-N-piperidino-1:1-diphenylpropan-1-ol (1 gram) is dissolved in anhydrous acetone (10 cubic centimetres), methyl iodide (1 gram) added and the mixture boiled under reflux for 15 minutes. On cooling N-methyl-3-hydroxy-3:3-diphenyl-propylpiperidinium iodide crystallises out and after recrystallisation from alcohol has melting point 214–215° C.

Example 2

3-dimethylamino-1:1-diphenylpropan-1-ol is prepared from the ethyl ester of β-dimethylaminopropionic acid (29 grams) and the Grignard reagent made from bromobenzene (110 grams) and magnesium (17 grams) by a method essentially similar to that described in Example 1 (above) for the preparation of 3-N-piperidino-1:1-diphenylpropan - 1 - ol. 3 - dimethylamino - 1:1 - diphenylpropan-1-ol has melting point 166° C. after recrystallisation from benzene or light petroleum.

3-dimethylamino-1:1-diphenylpropan-1-ol (4 grams) is dissolved in boiling ethyl alcohol (80 cubic centimetres) and ethyl iodide (5 grams) added and the mixture boiled under reflux for 2 hours. On cooling N-dimethyl-N-ethyl - 3 - hydroxy - 3:3-diphenylpropylammonium iodide crystallises out and melts at 200–201° C., with decomposition, after recrystallisation from ethyl alcohol.

Example 3

N-dimethyl-N-propyl-3-hydroxy-3:3-diphenylpropylammonium bromide similarly is prepared by boiling 3-dimethylamino - 1:1 - diphenylpropan-1-ol with 1-bromopropane in ethanolic solution for 5 hours (under reflux). The product melts with decomposition at 231–233° C.

Example 4

N - dimethyl-N-butyl-3-hydroxy-3:3-diphenylpropylammonium bromide is prepared from 3-dimethylamino-1:1-diphenylpropan-1-ol and 1-bromobutane in a similar manner to that described in Example 5. It has melting point 233–235° C. (with decomposition).

Example 5

3-dimethylamino-1:1-diphenylpropan-1-ol (2 grams) is dissolved in boiling ethyl alcohol (40 cubic centimetres) and benzyl chloride (3 grams) added, and the mixture boiled under reflux for 2 hours. The mixture is cooled, ether (50 cubic centimetres) is gradually added and the crystals of N-dimethyl-N-benzyl-3-hydroxy-3:3-diphenylpropylammonium chloride filtered off and recrystallized from ethyl alcohol; melting point 251° C., with decomposition.

Example 6

Ethyl β-di-n-propylaminopropionate (prepared as described by Weisel, Taylor, Mosher and Whitmore, Journal of the American Chemical Society, 1945, volume 67, page 1071) (40.2 grams) in anhydrous ether (50 cubic centimetres) treated with the Grignard reagent made from bromobenzene (110 grams) and magnesium (17 grams) under the conditions described in Example 1, yields 3-di-n-propylamino-1:1-diphenylpropan-1-ol which is purified by fractional distillation under reduced pressure (boiling point 153–154° C. at 0.1 mm.) and by recrystallization from light petroleum; the base has melting point 52.5–53.5° C.

The methiodide (N-methyl-N-dipropyl-3:3-diphenyl-3-hydroxypropylammonium iodide) prepared therefrom by the method described in Example 2 has melting point 181–183° C., after recrystallization from aqueous ethanol.

Example 7

Ethyl β - N - phenyl-N-methylaminopropionate (41.4 grams) in ether (100 cubic centimetres), treated with the Grignard reagent prepared from bromobenzene (110 grams) and magnesium (17 grams) in ether (200 cubic centimetres) in a similar manner to that described in Example 1, yields 3-N-phenyl-N-methylamino-1:1-diphenylpropan-1-ol, melting point 97° C. (recrystallized from ethanol). The ethyl β-N-phenyl-N-methylaminopropionate used as starting material is prepared by a method essentially similar to that described by Elderfield, Gensler, Bambry, Kremer, Brody, Hageman and Head, Journal of the American Chemical Society, 1946, volume 68, page 1259, for the preparation of β-arylaminopropionic esters.

A mixture of ethyl acrylate (40 g.), methyl-aniline (42.8 grams) and acetic acid (10 grams) is boiled under reflux for 12 hours, cooled, and taken up in an equal volume of ether. The ethereal solution is then washed with water, then with aqueous sodium bicarbonate solution and finally with water. The ethereal solution is then dried with anhydrous sodium sulphate, the ether evaporated, and the residual oil fractionally distilled under reduced pressure. The required ester is collected at 98–100° C./0.5 mm.

3 - N - phenyl-N-methylamino-1:1-diphenylpropan-1-ol (2.0 grams) is dissolved in ethanol (5.0 cc.), methyl iodide (2.0 grams) added and the mixture allowed to stand for 24 hours. The N-dimethyl-N-phenyl-3:3-diphenyl-3-hydroxypropylammonium iodide which separates melts with decomposition at 176° C., after recrystallization from aqueous ethanol.

Example 8

3-diethylamino-1:1-diphenylpropan - 1 - ol is prepared from the ethyl ester of β-diethylaminopropionic acid (35 grams) and the Grignard reagent made from bromobenzene (110 grams) and magnesium (17 grams) by a method essentially similar to that described in Example 1 (above) for the preparation of 3-N-piperidino-1:1-diphenylpropan-1-ol. 3 - diethylamino-1:1-diphenylpropan-1-ol, purified by distillation under reduced pressure (boiling point 154° C./0.2 mm.) or by recrystallisation from light petroleum, has melting point 53.5° C.

3-diethylamino-1:1-diphenylpropan-1-ol (1 gram) is dissolved in anhydrous acetone (2 cubic centimetres) methyl iodide (1 gram) in anhydrous acetone (2 cubic centimetres) added and the mixture allowed to stand for 2 hours. N - methyl-N-diethyl-3-hydroxy-3:3-diphenylpropylammonium iodide, which crystallises out, is recrystallised from methyl alcohol and has melting point 198–199° C.

Example 9

Ethyl β-N-pyrrolidinopropionate when treated with the Grignard reagent prepared from bromobenzene by the same method as that described in Example 1 yields 3-N-pyrrolidino-1:1-diphenylpropan-1-ol, melting point 171–172° C. (recrystallized from ethyl acetate).

The ethyl β-N-pyrrolidinopropionate is prepared by mixing pyrrolidine (21 grams) with ethyl acrylate (30 grams) and allowing to stand at room temperature for several days. The product is distilled under reduced pressure, the required ester being collected at 108–110° C./23 mm.

3-N-pyrrolidino-1:1-diphenylpropan-1-ol (2.0 grams) is dissolved in chloroform (25 cubic centimetres), methyl iodide (2.0 grams) added, and the mixture allowed to stand for 24 hours. The crystals of N-methyl-3:3-diphenyl-3-hydroxypropylpyrrolidinium iodide which separate are recrystallised from methanol; melting point 210° C.

Example 10

Ethyl β-N-morpholinopropionate (prepared as described by Weisel, Taylor, Mosher and Whitmore, Journal of the American Chemical Society, 1945, volume 67, page 1071) when treated with the Grignard reagent prepared from bromobenzene by the same method as that described in Example 1 yields 3-N-morpholino-1:1-diphenylpropan-1-ol, melting point 106° C. (recrystallised from light petroleum).

The corresponding methiodide is prepared by the method described in Example 1; it melts with decomposition at 203–204° C.

Example 11

3-diallylamino-1:1-diphenylpropan -1 - ol is prepared from ethyl β-diallyl-aminopropionate (39 grams) and the Grignard reagent made from bromobenzene (110 grams) and magnesium (17 grams) by a method essentially similar to that described in Example 1 for the preparation of 3-N-piperidino-1:1-diphenylpropan-1-ol. The product has boiling point 157–159° C./0.4 mm. after recrystallization from light petroleum.

3-diallylamino-1:1-diphenylpropan-1-ol (3 grams) is dissolved in anhydrous acetone (5 cubic centimetres) and methiodide (2 grams) added to the solution. The fine needles of N - methyl-N-diallyl-3:3-diphenyl-3-hydroxypropyl-ammonium iodide which quickly separate are recrystallized from aqueous methyl alcohol; melting point 196–197° C., with decomposition.

Example 12

β - Diethylaminopropiophenone hydrochloride (48.3 grams) is added in small portions to the Grignard reagent prepared from cyclohexyl bromide (98 grams) and magnesium (14.6 grams) in 100 cc. ether stirred and cooled to 0° C. After boiling under reflux for 12 hours the product is worked up by a similar method to that described in Example 1. 3-diethylamino-1-cyclohexyl-1-phenylpropan-1-ol is purified by distillation under reduced pressure (boiling point 132–135° C./0.02 mm.) and by recrystallisation from light petroleum (melting point 50.5–52° C.).

The tertiary base (1.0 gram) is dissolved in acetone (3 cubic centimetres) and methyl iodide (1.0 gram) added. After standing for several hours, crystallization of the product is completed by gradual addition of anhydrous ether. N - methyl - N - diethyl-3-cyclohexyl-3-phenyl-3-hydroxypropylammonium iodide has melting point 160–162° C. after recrystallisation from ethyl acetate and ethanol.

What I claim is:

1. Quaternary ammonium salts of tertiary amino alcohols of the formula

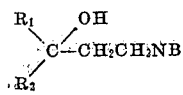

wherein $R_1$ and $R_2$ are phenyl and NB is a member of the group consisting of lower dialkylamino, piperidino and morpholino.

2. Quaternary ammonium salts of tertiary amino alcohols of the formula

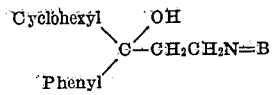

wherein N=B is a member of the group consisting of lower dialkylamino, morpholino, piperidino and pyrrolidino.

3. Quaternary ammonium salts of tertiary amino alcohol of the formula

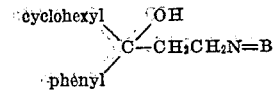

where N=B is pyrrolidino.

4. Quaternary ammonium salts of tertiary amino alcohols of the formula

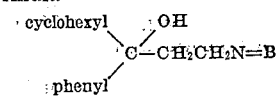

where N=B is lower dialkylamino.

5. Quaternary ammonium salts of tertiary amino alcohols of the formula

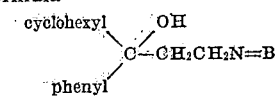

where N=B is piperidino.

6. Quaternary ammonium salts of tertiary amino alcohols of the formula

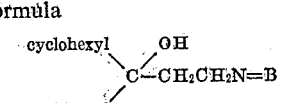

where N=B is morpholino.

7. Quaternary ammonium salts of tertiary amino alcohols of the formula

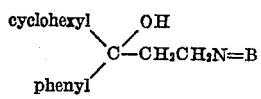

where N=B is diethylamino.

References Cited in the file of this patent

UNITED STATES PATENTS

| Number | Name | Date |
|---|---|---|
| 2,397,799 | Martin | Apr. 2, 1946 |
| 2,446,522 | Bockmuhl et al. | Aug. 10, 1948 |

OTHER REFERENCES

Richter, Textbook of Organic Chemistry, pp. 230 and 240, (1938 edition).

Kleiderer et al., Report No. PB 981, Office of the Publication Board, Dept. of Commerce, Washington, D. C., pp. 38 and 39.